United States Patent
Venkataramanan et al.

(10) Patent No.: US 10,114,142 B2
(45) Date of Patent: Oct. 30, 2018

(54) IMAGING SUBTERRANEAN FORMATIONS AND FEATURES USING MULTICOIL NMR MEASUREMENTS

(71) Applicant: Schlumberger Technology Corporation, Sugar Land, TX (US)

(72) Inventors: Lalitha Venkataramanan, Lexington, MA (US); Robert Callan, New York, NY (US); Lukasz Zielinski, Cambridge (GB); Martin Hurlimann, Newton, MA (US); Timothy Andrew John Hopper, Subiaco (AU)

(*) Notice: Subject to any disclaimer, the term of this patent is extended or adjusted under 35 U.S.C. 154(b) by 326 days.

(21) Appl. No.: 14/975,649

(22) Filed: Dec. 18, 2015

(65) Prior Publication Data
US 2017/0176627 A1    Jun. 22, 2017

(51) Int. Cl.
*G01V 3/32* (2006.01)
*G01V 3/38* (2006.01)

(52) U.S. Cl.
CPC . *G01V 3/32* (2013.01); *G01V 3/38* (2013.01)

(58) Field of Classification Search
CPC .................................. G01V 3/32; G01V 3/38
USPC ......................................................... 324/303
See application file for complete search history.

(56) References Cited

U.S. PATENT DOCUMENTS

| | | | |
|---|---|---|---|
| 5,629,623 A | 5/1997 | Sezginer et al. | |
| 6,326,784 B1 | 12/2001 | Ganesan et al. | |
| 9,069,098 B2 | 6/2015 | Hopper et al. | |
| 2004/0130324 A1 | 7/2004 | Edwards | |
| 2005/0132794 A1* | 6/2005 | Spross | G01V 11/00 702/11 |
| 2013/0060474 A1 | 3/2013 | Venkataramanan et al. | |
| 2013/0093422 A1* | 4/2013 | Morys | G01V 3/32 324/303 |
| 2014/0067273 A1* | 3/2014 | Puryear | G01V 1/30 702/14 |

FOREIGN PATENT DOCUMENTS

WO    2015131016 A1    9/2015

OTHER PUBLICATIONS

Song et al.; "T1-T2 Correlation Spectra Obtained Using a Fast Two-Dimensional Laplace Inversion"; Pub Date Jan. 16, 2002; Journal of Magnetic Resonance 154; p. 261-268.*
Venkataramanan, L. et al., "Mellin Transform of CPMG Data", Journal of Magnetic Resonance, 2010, 206(1), pp. 20-31.
Venkataramanan, L. et al., "Solving Fredholm Integrals of the First Kind with Tensor Product Structure in 2 and 2.5 Dimensions", IEEE Transactions on Signal Processing, 2002, 50, pp. 1017-1026.
International Search Report and Written Opinion issued in International Application No. PCT/US2016/067418 dated Apr. 6, 2017, 17 pages.

* cited by examiner

*Primary Examiner* — Melissa Koval
*Assistant Examiner* — Rahul Maini

(57) ABSTRACT

Systems and methods are provided for investigating a downhole formation using a nuclear magnetic resonance (NMR) tool having two or more radio frequency receiving coils. While the tool is moving through the borehole, the formation is magnetized and resulting signals are obtained. In accordance with the present approach, the acquired signals can be resolved azimuthally and can be reconstructed to obtain an indication of a parameter of the formation at multiple locations along the length of the borehole.

20 Claims, 7 Drawing Sheets

SINGLE            MULTIPLE COILS

IMAGING SUBTERRANEAN FORMATIONS AND FEATURES USING MULTICOIL NMR MEASUREMENTS

BACKGROUND

This disclosure relates to the use of nuclear magnetic resonance (NMR) in the context of imaging subterranean formations and features. In certain embodiments, the subject matter relates to methods for facilitating azimuthal imaging using a multicoil NMR tool deployed in a borehole.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as an admission of any kind.

Magnetic resonance imaging involves the spatial localization of protons within a sample space. Nuclear Magnetic Resonance (NMR) tools used for well-logging or downhole fluid characterization measure the response of nuclear spins in formation fluids to applied magnetic fields. Downhole NMR tools typically have a permanent magnet that produces a static magnetic field at a desired test location (e.g., where the fluid is located). The static magnetic field produces a magnetization in the fluid. The magnetization is aligned along the direction of the static field. The magnitude of the induced magnetization is proportional to the magnitude of the static field. A transmitter antenna produces a time-dependent radio frequency magnetic field that has a component perpendicular to the direction of the static field. The NMR resonance condition is satisfied when the radio frequency is equal to the Larmor frequency, which is proportional to the magnitude of the static magnetic field. The radio frequency magnetic field produces a torque on the magnetization vector that causes it to rotate about the axis of the applied radio frequency field. The rotation results in the magnetization vector developing a component perpendicular to the direction of the static magnetic field. This causes the magnetization vector to precess around the static field at the Larmor frequency. At resonance between the Larmor and transmitter frequencies, the magnetization is tipped to the transverse plane (i.e., a plane normal to static magnetic field vector). A series of radio frequency pulses are applied to generate spin echoes that are measured with the antenna.

NMR measurements can be used to estimate, among other things, formation porosity and formation permeability. For example, the area under the curve of a T2 distribution for a NMR measurement equals the NMR porosity. The T2 distribution also resembles the pore size distribution in water-saturated rocks. The raw reported porosity is provided by the ratio of the initial amplitude of the raw decay and the tool response in a water tank. This porosity is independent of the lithology of the rock matrix.

The NMR estimate of permeability is based on a theoretical model such as the Free-fluid (Coates) model or the average-T2 model. The Free-fluid model can be applied in formations containing water and/or hydrocarbons, while the average-T2 model can be applied to pore systems containing water only. Measurements on core samples are generally required to refine and customize those models for local use. The NMR permeability tends to increase with both increasing porosity and increasing pore size.

Crude oil properties such as viscosity, molecular composition, gas-oil ratio, and SARA (saturates, aromatics, resins, asphaltenes) fractions are useful parameters for evaluating, for example, reservoir quality, producibility, and compartmentalization. Physical and empirical model-based equations have been developed which relate the properties of crude oils to Nuclear Magnetic Resonance (NMR) measurements. NMR response of fluids provides a link between microscopic molecular motions and macroscopic properties such as viscosity and composition. The relationship between viscosity and relaxation time of pure fluids was established by the phenomenological relaxation theory of Bloembergen, Purcell, and Pound (BPP). Brown studied proton relaxation in a suite of crude oils with various compositions and viscosities. The viscosities of the samples varied from about 0.5 to 400 cp. He found that the relaxation times showed an inverse dependence on viscosity over the entire range. Since the early work of Brown, several physical and empirical models have been proposed that relate crude oil properties to NMR response. Understanding of molecular dynamics in alkane mixture resulted in the establishment of a scale-law theory to relate NMR diffusion and relaxation properties to the molecular composition of crude oils. There are also other database approaches such as, for example, Artificial Neural Networks (ANN) and Radial Basis Function.

Characterization of reservoir fluids is useful for several aspects of reservoir development and management. For example, fluid properties such as viscosity and molecular composition are used to calculate flow rates and sweep efficiencies of secondary and tertiary recoveries. Gas-oil ratio (GOR) of reservoir fluids is an important parameter for material selection of well completion and design of surface facilities. Asphaltene and wax concentrations are key considerations for flow assurance in completions, pipelines, and surface facilities. Estimation of fluid properties at different depths in a reservoir provides indications of compositional grading and compartmentalization within the reservoir. It is useful to obtain fluid properties from measurements such as NMR well-logging which can be performed at downhole temperature and pressure conditions.

Borehole images allow one to interpret the rock record for oil and gas exploration. In addition to identifying fractures and faults, borehole imaging tools are used for a variety of other applications such as sequence stratigraphy, facies reconstruction, stratigraphy, and diagenetic analysis. They can be used in a wide variety of geological and drilling environments, providing high resolution borehole images of rock and fluid properties in formations ranging from fractured carbonates to soft, thinly laminated sand/shale sequences. These tools produce high resolution and often nearly complete borehole coverage, which may be interpreted at an interactive graphics workstation.

NMR well-logging tools differ from those commonly used in the medical field in many respects. Obviously the operating environment for a downhole tool is much harsher than the laboratory setting of an imaging facility. In addition, a downhole NMR is configured "inside-out" relative to a typical "closed" medical NMR device. That is, medical devices usually look inward to their targeted area, whereas downhole NMR devices look outward into the surrounding formation.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, an NMR tool having a source and multiple receiver coils is run along all or part of the length of a borehole either with rotation (i.e., logging-while-drilling (LWD) or without (i.e., wireline logging)) and methods are provided for interpreting and analyzing multiple detector NMR data. In certain implementations, the applied magnetic field is uniform (i.e., there is no azimuthal variation in the applied magnetic field), however the sensitivity of the multicoil signal detector (i.e., the radio frequency detection coils) does vary. This sensitivity varies during each measurement as the tool rotates. As a result, the detected signal contains spatial information that can be associated with azimuthal direction. In one embodiment, the data is analyzed in order to obtain the $T_2$ distribution profile as a function of azimuthal and/or lateral location along the borehole. With multiple detectors and methods for interpreting and analyzing resulting data, according to one aspect, the azimuthal and/or lateral formation data may be obtained and used in evaluating a site or operation.

DETAILED DESCRIPTION

Figure 1:
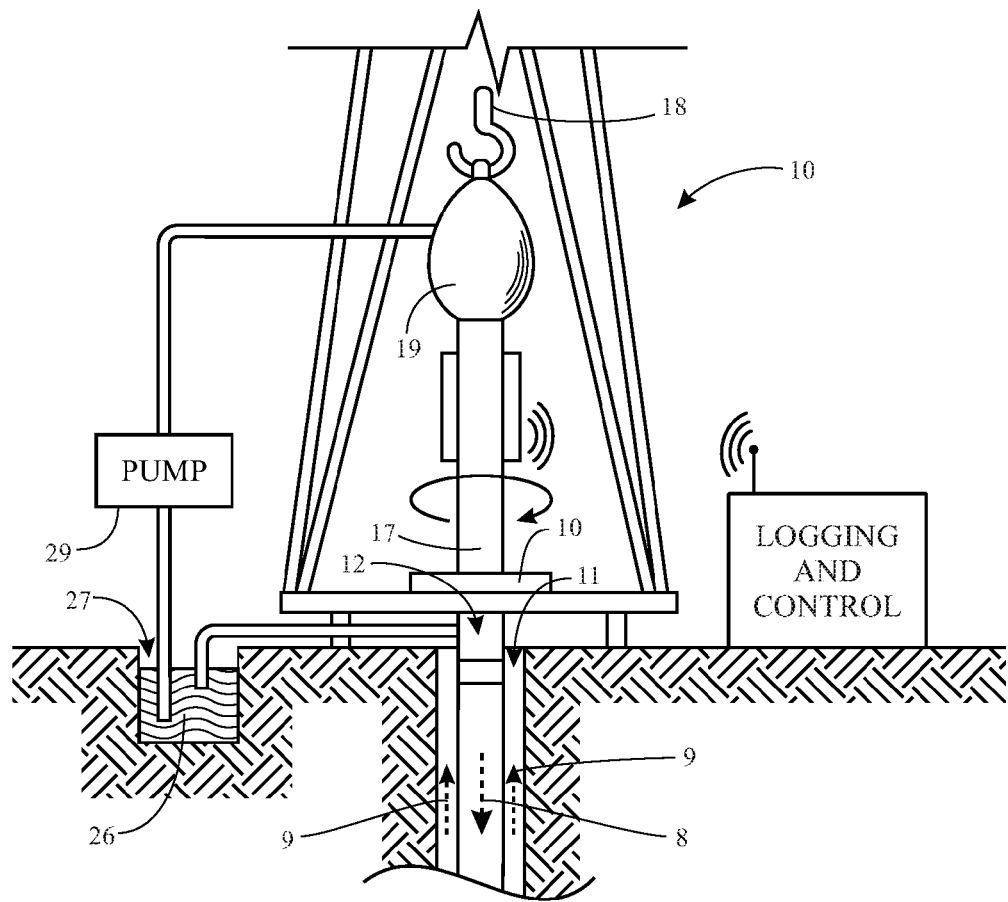
FIG. 1 illustrates an exemplary well site system.

One or more specific embodiments will be described below. The description and drawings provided demonstrate to those skilled in the art how the several forms of the subject disclosure may be embodied in practice. In an effort to provide a concise description of these embodiments, all features of an actual implementation may not be described in the specification. In this regard, no attempt is made to show details in more detail than is necessary for one skilled in the art to comprehend and practice the present approaches. It should be appreciated that in the development of an implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Furthermore, any numerical examples in the following discussion are intended to be non-limiting, and thus additional numerical values, ranges, and percentages are within the scope of the disclosed embodiments. Furthermore, like reference numbers and designations in the various drawings indicate like elements.

The present discussion relates to performing azimuthal imaging using nuclear magnetic resonance (NMR) measurements, typically acquired in a logging-while-drilling context. Such approaches employ a forward model and associated inversion algorithm as part of the azimuthal imaging process and, as discussed herein, azimuthal measurements can be acquired using a variety of different kinds of antennae, including, multiple coils on a receiver antenna. In certain implementations, the applied magnetic field is uniform (i.e., there is no azimuthal variation in the applied magnetic field), however the sensitivity of the multicoil signal detector (i.e., the radio frequency detection coils) does vary. This sensitivity varies during each measurement as the tool rotates. As a result, the detected signal contains spatial information that can be associated with azimuthal direction.

In certain implementations, the generalized forward model is a linear transformation of formation-dependent properties, such as the azimuth-dependent $T_2$ distribution, and is a convolution of these properties with a time-dependent kernel. The inversion algorithm is based on the deconvolution of the measured data with the known kernel after expansion into a suitable basis of orthogonal functions (such as Fourier or Haar basis).

Such azimuthal information may be useful for geo-steering and to obtain azimuth-dependent formation parameters, such as porosity, bound fluid volume, permeability and logarithmic mean $T_2$. Though subterranean imaging examples are described herein to provide useful context, in practice the present approaches can be used in various contexts.

Before providing a detailed discussion of these various embodiments, a generalized overview of certain well-site terminology and NMR concepts is provided for those unfamiliar with one or both of well-site or NMR terminology and principles. With this in mind, and turning to FIG. 1, this figure illustrates a well site system in which various embodiments discussed therein can be employed. The well site can be onshore or offshore. In this exemplary system, a borehole 11 is formed in subsurface formations by rotary drilling in a manner that is known. Some embodiments can also use directional drilling.

A drill string 12 is suspended within the borehole 11 and has a bottom hole assembly 100 which includes a drill bit 105 at its lower end. The surface system includes platform and derrick assembly 10 positioned over the borehole 11, the assembly 10 including a rotary table 16, kelly 17, hook 18 and rotary swivel 19. The drill string 12 is rotated by the rotary table 16, which engages the kelly 17 at the upper end of the drill string. The drill string 12 is suspended from a hook 18, attached to a traveling block through the kelly 17 and a rotary swivel 19 which permits rotation of the drill string relative to the hook. A top drive system could alternatively be used.

In the example of this embodiment, the surface system further includes drilling fluid or mud 26 stored in a pit 27 formed at the well site. A pump 29 delivers the drilling fluid 26 to the interior of the drill string 12 via a port in the swivel 19, causing the drilling fluid to flow downwardly through the drill string 12 as indicated by the directional arrow 8. The drilling fluid exits the drill string 12 via ports in the drill bit 105, and then circulates upwardly through the annulus region between the outside of the drill string and the wall of the borehole, as indicated by the directional arrows 9. In this manner, the drilling fluid lubricates the drill bit 105 and carries formation cuttings up to the surface as it is returned to the pit 27 for recirculation.

The bottom hole assembly 100 of the illustrated embodiment includes a logging-while-drilling (LWD) module 120, a measuring-while-drilling (MWD) module 130, a roto-steerable system and motor 150, and drill bit 105. The LWD module 120 is housed in a special type of drill collar and can contain one or more types of logging tools. More than one LWD and/or MWD module can be employed, e.g. as represented at 120A. As may be appreciated, reference herein to a module at the position of 120 can alternatively mean a module at the position of 120A, and so forth. The LWD module includes capabilities for measuring, processing, and storing information, as well as for communicating with the surface equipment. In the present embodiment, the LWD module includes a NMR measuring device.

The MWD module 130 is also housed in a special type of drill collar and can contain one or more devices for measuring characteristics of the drill string and drill bit. The MWD tool further includes an apparatus for generating electrical power to the downhole system. This may typically include a mud turbine generator powered by the flow of the drilling fluid, it being understood that other power and/or battery systems may be employed. In certain embodiments, the MWD module may include one or more of the following types of measuring devices: a weight-on-bit measuring device, a torque measuring device, a vibration measuring device, a shock measuring device, a stick/slip measuring device, a direction measuring device, and an inclination measuring device.

Figure 2:
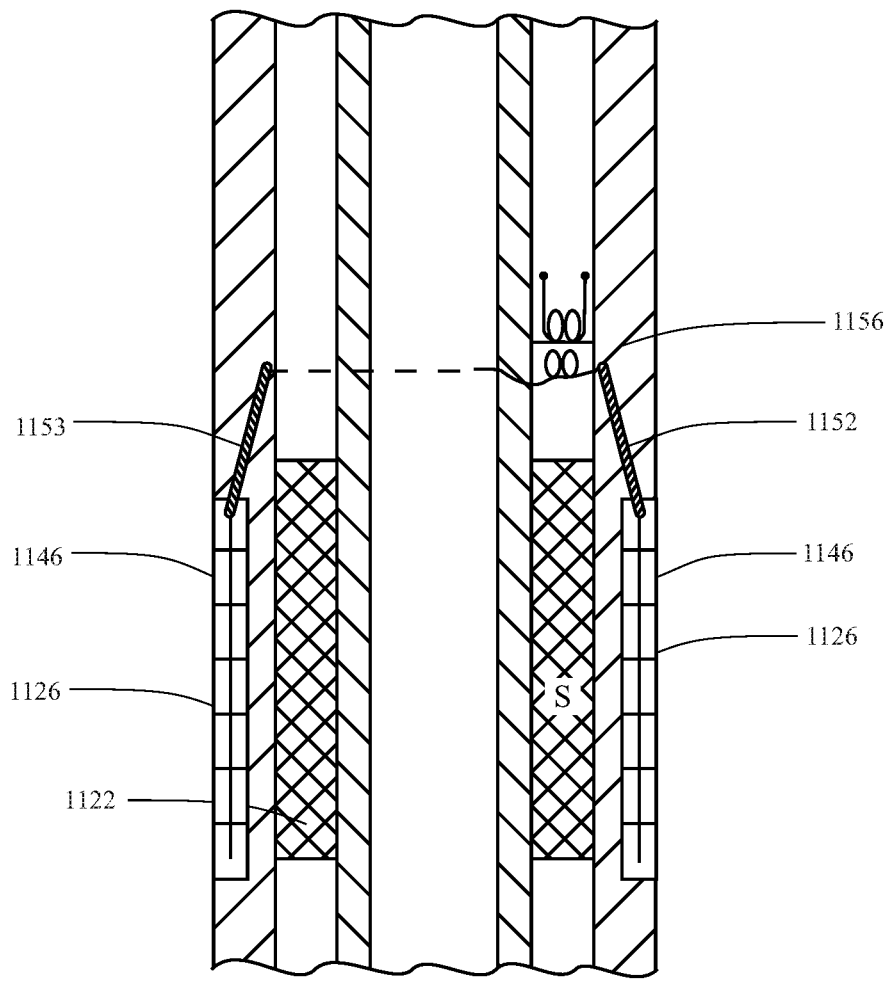
FIG. 2 shows a prior art nuclear magnetic resonance logging tool.

FIG. 2 shows an embodiment of a type of device described in U.S. Pat. No. 5,629,623 for formation evaluation while drilling using pulsed nuclear magnetic resonance (NMR), incorporated herein by reference, it being understood that other types of NMR/LWD tools can also be utilized as the LWD tool 120 or part of an LWD tool suite 120A. As described in the '623 patent, an embodiment of one configuration of the device comprises a modified drill collar having an axial groove or slot that is filled with a ceramic insulator, and contains RF antenna 1126, which is protected by a non-magnetic cover 1146 and produces and receives pulsed RF electromagnetic energy. In the embodiment shown, the conductors of the RF antenna are grounded at one end to the drill collar. At the other end, the conductors are coupled to an RF transformer 1156 via pressure feedthroughs 1152 and 1153. A cylindrical magnet 1122 produces a static magnetic field in the formations. The RF antenna can also be arranged so that the drill collar itself produces the oscillating RF magnetic field. The oscillating RF magnetic field, which excites nuclei of substances in the formations, is azimuthally symmetric, to facilitate measurements during rotation of the drill string.

Magnetic resonance imaging involves the spatial localization of protons within a sample space. As discussed herein, one possible imaging technique involves the use of multiple receiver coils placed in an array. Each coil receives signal from a localized area that can be reconstructed into an image covering the region of interest. Thus, it is possible to obtain an azimuthal image of some aspect of the sample space.

Figure 3:
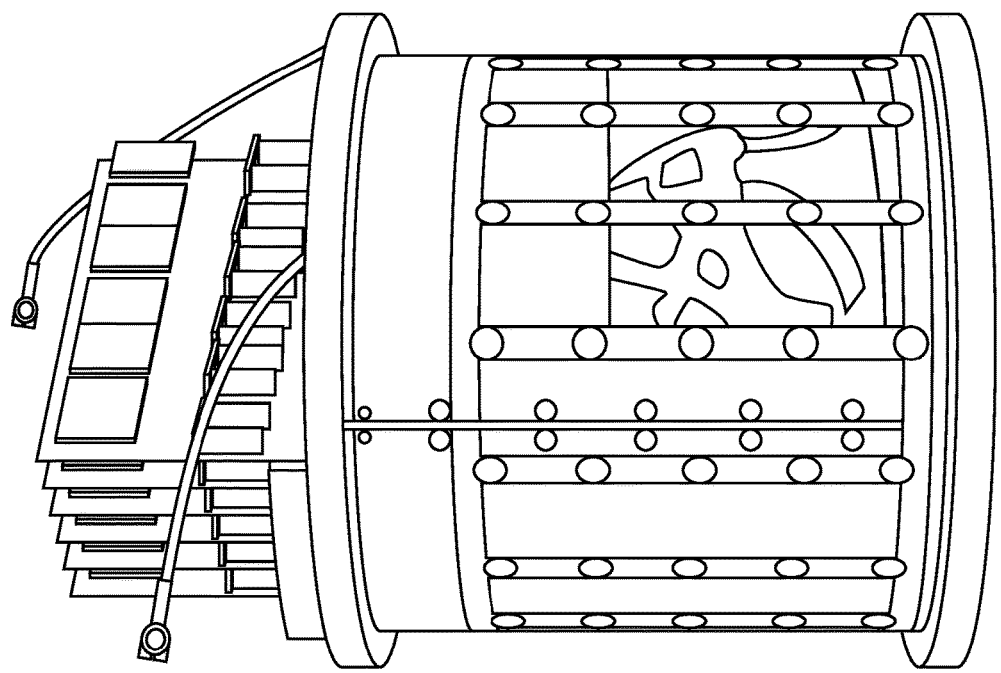
FIG. 3 shows an example prior art Magnetic Resonance Imaging (MRI) coil typically used in a laboratory.

FIG. 3 shows an example of a prior art MRI (magnetic resonance imaging) antenna typically used in a laboratory setting. This antenna is a "phased array" antenna made up of a series of rectangular coils overlapping each other by an optimal distance. The coil arrangement is optimized to reduce mutual coupling.

A small surface coil generally provides a lower noise level than a large coil because the smaller coil has a smaller sensitive region and thus, the amount of noise received from that smaller sensitive region is less than the amount of noise received by the larger coil since the larger coil receives signal from the entire sample. Since each coil is designed to receive signal from a different region, we denote the signal from coil i to be $S_i$. Since the spatial arrangement of the coils is known by the design of the coils, the signal $S_i$ is directly determined by the spatial distribution of the precessing magnetization. Analysis of the signals can produce an image of the borehole properties, such as T2 (distribution or log mean), porosity, permeability, bound and free fluids, and crude oil properties.

Excitation of the transmitter coils can be achieved in at least two ways. The coils can be excited in series, whereby they effectively act as one coil, or each coil can be independently excited (in parallel). The coils may be tuned or left un-tuned. When transmitting in series and receiving in parallel, the coil is generally called a "uncoil".

It is also possible to design the coil assembly to include a transmitter coil to be used to excite the entire sample region while the signal reception is performed by the array of smaller coils. This technique separates the transmission and reception coils and may include electronics (e.g., a deplexer) to protect the reception coils and the receiver electronics during the transmission of the strong RF pulses.

Detection may be achieved through each coil independently of the other coils. One possible embodiment is to have each coil with its own tank circuit, duplexer, pre-amplifier, and receiver. This way, the signal from each coil can be processed and then added later. In the case of downhole NMR applications, a sum of the signals from all the receiver coils will yield the total porosity, T2, or other parameters. If the signals are kept separate, they can be processed to provide an azimuthal image. This image could be based on porosity or bound fluid or some other identifier.

Figure 4:
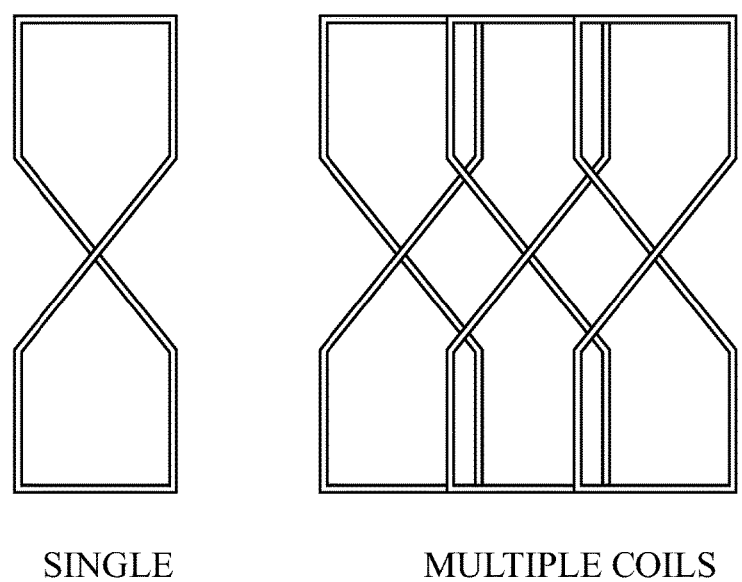
FIG. 4 schematically shows a single "figure-8" style coil and a set of multiple (three "figure-8" style) coils in an array, in accordance with the present disclosure.
Figure 8:
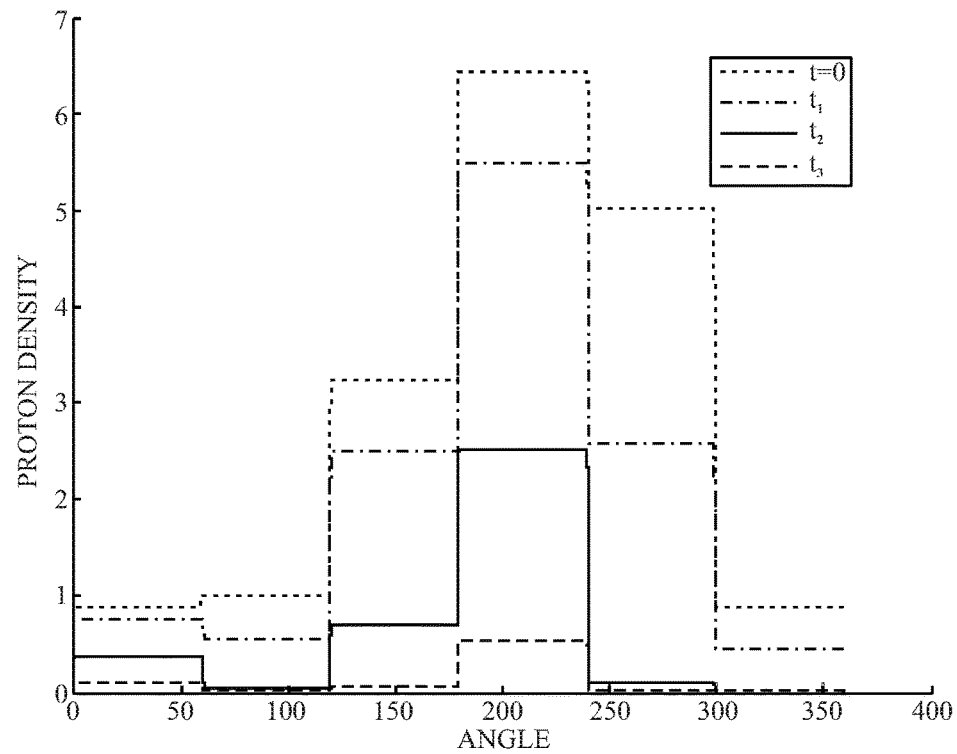
FIG. 8 depicts sorting of azimuthal spin information into bins, in accordance with aspects of the present disclosure.

FIG. 4 schematically shows a single "figure-8" style coil and a set of multiple (three "figure-8" style) coils in an array. As can be seen in FIG. 4, the coils may overlap with each other.

Figure 5A:
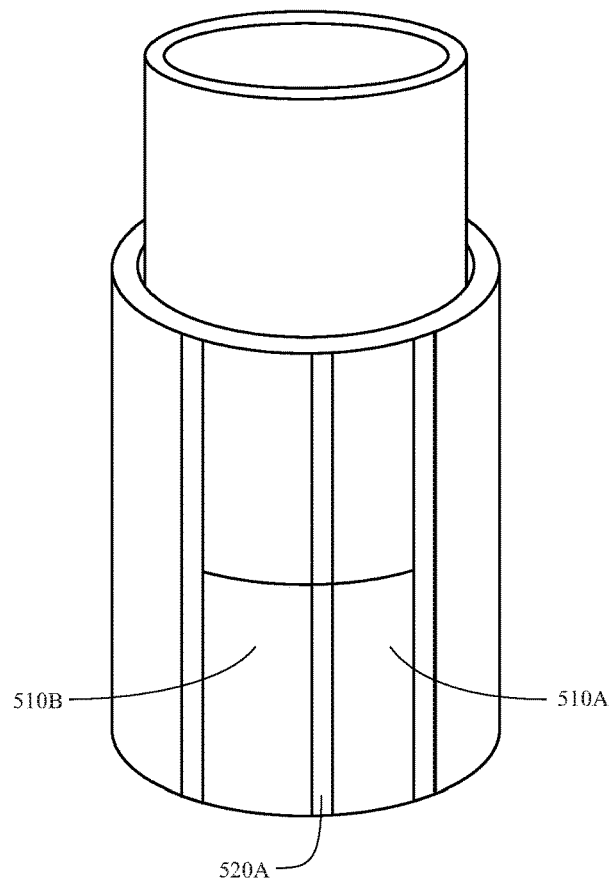
FIGS. 5A and 5B shows an embodiment of a phased array antenna for use in a downhole NMR tool, in accordance with the present disclosure.
Figure 5B:
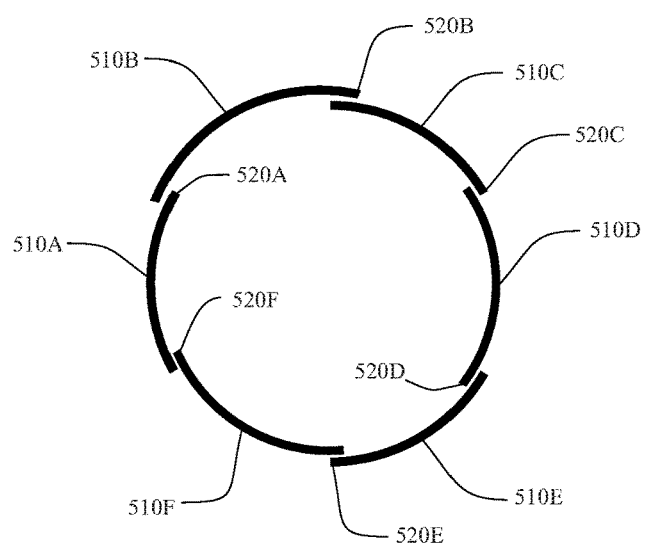

FIGS. 5A and 5B show an embodiment of a phased array antenna for use in a downhole NMR tool. As shown in the side view schematic of FIG. 5A and the top view schematic of FIG. 5B, the phased array antenna includes six separate coils 510A-F, all overlapping each other at overlap points 520A-F.

Figure 6:
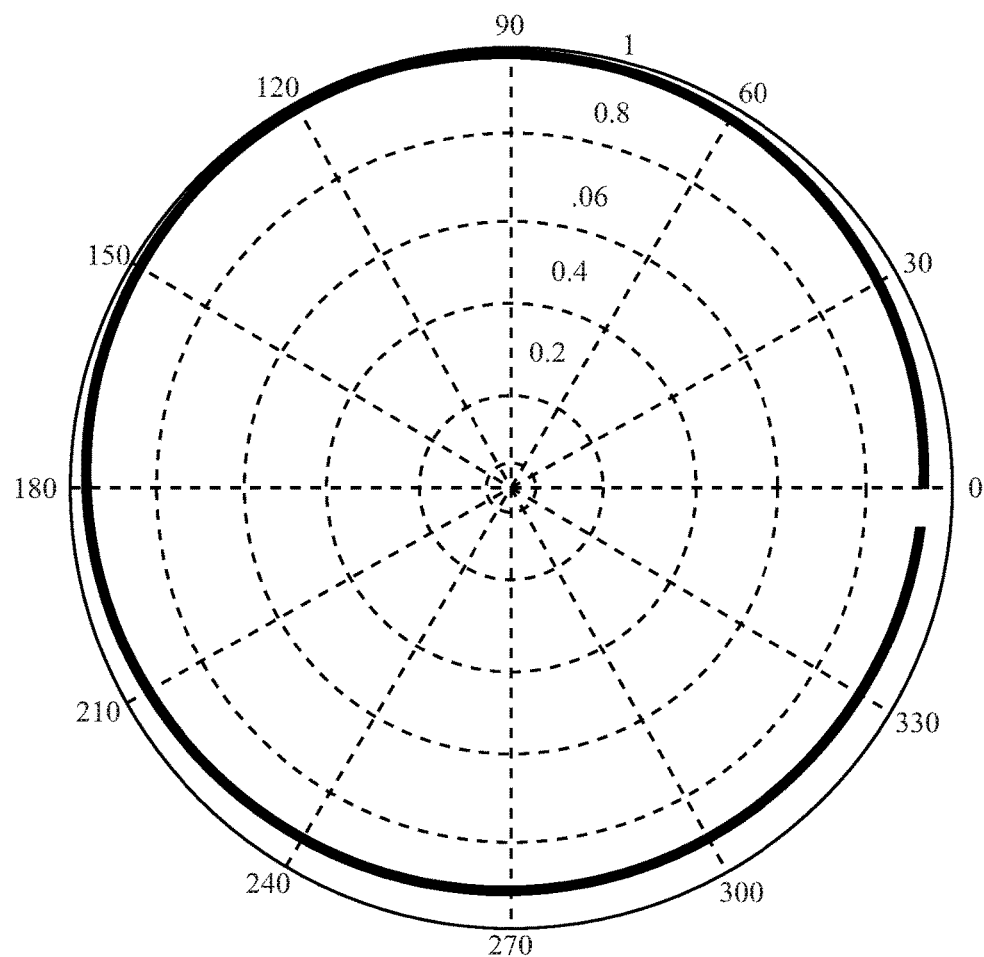
FIG. 6 is a plot of radio frequency (RF) field measurements of the B1 field generated when the coils are fired in series, in accordance with the present disclosure.

FIG. 6 is a plot of radio frequency (RF) field measurements of the B1 field generated when the coils are fired in series. The plot shows the homogeneity of the field.

The signals from each coil can also be combined prior to the pre-amplifier and receiver circuitry. This simplifies the operation of the entire setup, but the data would no longer provide an image. It would however, further increase the SNR.

With the preceding in mind, a method of operating multiple-receiver coils in a downhole environment is further described.

In particular, with respect to use of such a multicoil logging-while-drilling tool, in one embodiment, a processor is coupled to the multicoil tool and used to generate a visible indication of a parameter of the formation. As discussed herein, in one embodiment, the excitation and detection circuitry of such a tool may include a single excitation coil and a series of detection coils. Each coil may have its own receiver electronics in order to receive its signal independent from other coils. Each receiver may contain a low noise preamplifier, a variable gain amplifier, and feedback circuitry to stabilize the receiver. Each coil may be associated with its own processor, or one or more processors may be coupled to all of the coils. In other embodiments, the excitation and detection module may comprise a string of coaxial RF coil antennas in series that can be pulsed on simultaneously (e.g., so that they behave as a single large coil) or individually for transmission and have separate (individual) detection.

With a multicoil NMR logging tool as described herein, it is useful to detail the NMR signal behavior and to provide inversion algorithms to recover a $T_2$ distribution profile. Prior to discussing the inversion algorithms for azimuthal imaging an overview of the generalized forward model employed in the present approaches is provided. As noted above, the generalized forward model is a linear transformation of formation properties such as azimuth dependent $T_2$ distribution and is a convolution of these properties with a time-dependent kernel. With this in mind, let $f(T_2, \psi)$ denote the unknown $T_2$ distribution at formation angle $\psi$, where $0 \leq \psi \leq 2\pi$. The CPMG magnetization decay in the formation denoted as $M_t(\psi)$ is a Laplace transform of this unknown $T_2$ distribution:

$$M_t(\psi) = \int_0^\infty f(T_2, \psi) e^{-t/T_2} dT_2. \quad (1)$$

The measured data is a convolution of this azimuth dependent magnetization with a known kernel that is dependent on the tool geometry and which may differ for the various embodiments described herein, as discussed in greater detail below.

Present Embodiments

The present discussion relates to performing azimuthal imaging using nuclear magnetic resonance (NMR) measurements acquired in logging-while-drilling. Such approaches employ a forward model and inversion algorithm as part of the azimuthal imaging process and, as discussed herein, azimuthal measurements can be acquired using a variety of different kinds of antennae, including multiple radio frequency coils of a receiver antenna. The generalized forward model is a linear transformation of formation-dependent properties, such as the azimuth-dependent $T_2$ distribution, and is a convolution of these properties with a time-dependent kernel. The inversion algorithm is based on the deconvolution of the measured data with the known kernel after expansion into a suitable basis of orthogonal functions (such as Fourier or Haar basis).

Such azimuthal information may be useful for geo-steering and to obtain azimuth-dependent formation parameters, such as porosity, bound fluid volume, permeability and logarithmic mean $T_2$. These measurements may be acquired using different tool geometries. As discussed herein, a variety of embodiments are contemplated and described.

In certain multicoil embodiments discussed herein, the spins are measured with multiple receiving coils mounted on a single frame. As the coils rotate with the drill string, the multiple receiving coils are locally sensitive to those spins which they face at any given moment within the rotation. In such an implementation, the inversion algorithm estimates azimuth dependent formation parameters from the multiple receivers even though the sensitivity of individual coils and the measurement is changing over time due to the tool rotation.

Forward Model and Kernel—Multicoil Concept:

With respect to the multicoil concept discussed herein, the forward model is described by:

$$M_t(\theta_j(t)) = \int_0^{2\pi} M_t(\psi) k(\theta_j(t) - \psi) d\psi. \quad (2)$$

Figure 7:
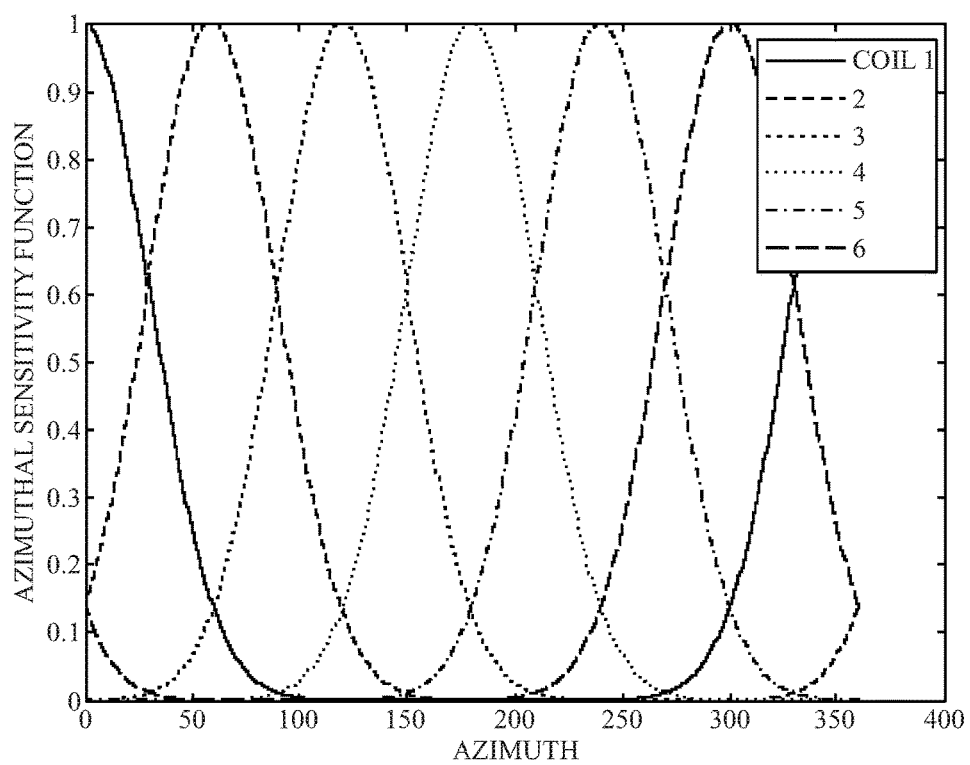
FIG. 7 depicts an example of a sensitivity kernel of receiving coil array showing sensitivity localized in space, in accordance with aspects of the present disclosure.

The left-hand side of equation (2) denoted the measured data at time t when the j-th receiving coil points to time-dependent angle $\theta_j(t)$. In one scenario, the 90° and/or 180° pulses are fired by the transmitter. Because the receiving coils are rotating over time, the angle $\theta_j(t)$ is a function of time and varies during one CPMG measurement. In this context, $j = 1, \ldots N_c$ corresponds to the index of the position of the receiving coil. An example of the kernels for an equi-angled six receiving coil embodiment is shown in FIG. 7. As shown in FIG. 7, the sensitivity of each receiving coil (one through six) is localized in space and, therefore, each coil is sensitive to different parts of the formation at different times due to rotation of the tool. With this in mind, the kernel for the multicoil concept is constantly changing during operation.

With the preceding in mind, an implementation may be contemplated in which, for a given formation and depth, the spins are azimuthally separated into multiple bins based on angular range (e.g., 0°-60°, 61°-120°, 121°-180°, and so forth), as is shown in FIG. 8. In such an example, the spins in each bin decay at different rates and the different traces correspond to magnetization at different times (i.e., $t_0$, $t_1$, $t_2$, $t_3$). Further, in this example, the respective traces illustrate the amplitude of the magnetization in the different spins at different times.

Figure 9:
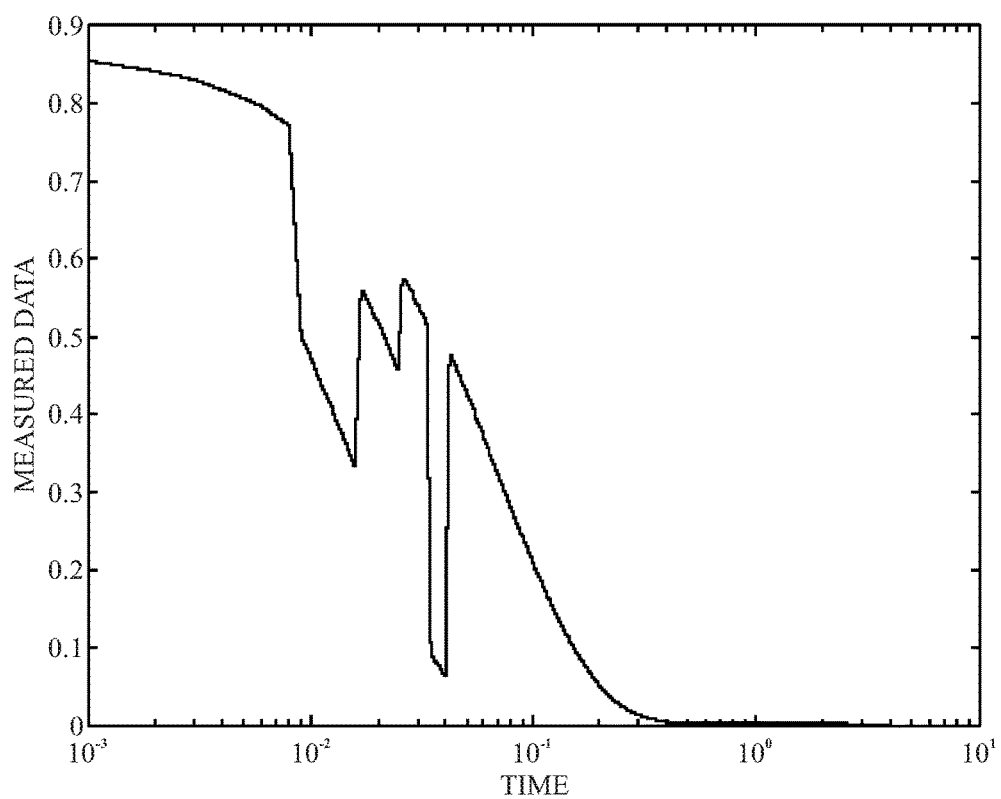
FIG. 9 depicts simulated magnetization data from rotating coil on a rotating tool, in accordance with aspects of the present disclosure.

Turning to FIG. 9, this figure depicts simulated magnetization from data from one of these rotating coils as it moves from one bin to another when the kernel is a Dirac delta function in space. As shown, the magnetization does not have to exhibit exponential decay. As will be appreciated, this is unlike typically observed scenarios in well logging where the measurement is azimuthally averaged and exhibits exponential decay.

With this in mind, these measurements call for development of an inversion algorithm that takes into account the features of tool physics, time-varying kernel, and tool rotation discussed herein.

Inversion Algorithm—General

As noted above, the inversion algorithm is based on the deconvolution of the measured data with the known kernel once the data has been expanded into a suitable basis of orthogonal functions. The inversion algorithm computes the azimuth dependent $T_2$ distribution $f(T_2, \psi)$ from the measured data $M_t(\theta_j(t)), j = 1, \ldots, N_c$. The inversion can be performed in two steps. First, the azimuth-dependent magnetization $M_t(\psi)$ is computed. Next, from the estimate of $M_t(\psi)$, an inverse Laplace-like algorithm is employed to estimate $f(T_2,\psi)$.

a) Estimate of Azimuth-Dependent Magnetization

At any instant of time t, the azimuth dependent magnetization is periodic with period $2\pi$. Therefore, it can be expressed in terms of the Fourier basis:

$$M_t(\psi) = \frac{a_{0,t}}{\sqrt{2\pi}} + \frac{1}{\sqrt{\pi}} \sum_{n=1}^{\infty} a_{n,t}\cos(n\psi) + b_{n,t}\sin(n\psi) \qquad (3)$$

where the Fourier coefficients $a_{o,t}$, $a_{n,t}$, and $b_{n,t}$ are given by:

$$a_{0,t} = \frac{1}{\sqrt{2\pi}} \int_0^{2\pi} M_t(\psi)d\psi \qquad (4)$$

$$a_{n,t} = \frac{1}{\sqrt{\pi}} \int_0^{2\pi} M_t(\psi)\cos(n\psi)d\psi \qquad (5)$$

$$b_{n,t} = \frac{1}{\sqrt{\pi}} \int_0^{2\pi} M_t(\psi)\sin(n\psi)d\psi. \qquad (6)$$

In this example, the Fourier expression of the kernel may be represented as:

$$\kappa(\psi) = \frac{x_0}{\sqrt{2\pi}} + \frac{1}{\sqrt{\pi}} \sum_{n=1}^{\infty} x_n\cos(n\psi) + y_n\sin(n\psi) \qquad (7)$$

where the Fourier coefficients $x_0$ and $x_n$, $y_n$ can be computed from the known kernel:

$$x_0 = \frac{1}{\sqrt{2\pi}} \int_0^{2\pi} \kappa(\psi)d\psi \qquad (8)$$

$$x_n = \frac{1}{\sqrt{\pi}} \int_0^{2\pi} \kappa(\psi)\cos(n\psi)d\psi \qquad (9)$$

$$y_n = \frac{1}{\sqrt{\pi}} \int_0^{2\pi} \kappa(\psi)\sin(n\psi)d\psi. \qquad (10)$$

In the case of the multicoil concept these Fourier coefficients are dependent on the time-dependent kernel.

At any time t equation (2) (i.e., the respective forward models for the multicoil concept) can be rewritten as:

$$M_t(\theta_j) = a_{0,t}x_0 + \sum_{n=1}^{\infty} a_{n,t}[\cos(n\theta_j)x_n + \sin(n\theta_j)y_n] + b_{n,t}[\sin(n\theta_j)x_n - \cos(n\theta_j)y_n], j=1,\ldots,N_c. \qquad (11)$$

When the kernel is symmetric, $y_n=0$. In these cases, the coefficients $a_{0,t}$, $a_{n,t}$, $b_{n,t}$, $n=1,\ldots N_F$ can be solved by a linear system of equations:

$$\begin{bmatrix} M_t(\theta_1) \\ M_t(\theta_2) \\ \vdots \\ M_t(\theta_{N_c}) \end{bmatrix} = \begin{bmatrix} x_0 & x_1\cos(\theta_1) & x_1\sin(\theta_1) & \ldots & x_{N_F}\cos(N_F\theta_1) & x_{N_F}\sin(N_F\theta_1) \\ x_0 & x_1\cos(\theta_2) & x_1\sin(\theta_2) & \ldots & x_{N_F}\cos(N_F\theta_2) & x_{N_F}\sin(N_F\theta_2) \\ & & & \vdots & & \\ x_0 & x_1\cos(\theta_{N_c}) & x_1\sin(\theta_{N_c}) & \ldots & x_{N_F}\cos(N_F\theta_{N_c}) & x_{N_F}\sin(N_F\theta_{N_c}) \end{bmatrix} \begin{bmatrix} a_{0,t} \\ a_{1,t} \\ b_{1,t} \\ \vdots \\ a_{N_F,t} \\ b_{N_F,t} \end{bmatrix} \qquad (12)$$

where $N_F$ refers to the number of Fourier coefficients. From these estimated coefficients, the estimated magnetization at any time t at azimuth $\psi$ is:

$$\tilde{M}_t(\psi) \approx \frac{a_{0,t}}{\sqrt{2\pi}} + \frac{1}{\sqrt{\pi}} \sum_{n=1}^{N_F} a_{n,t}\cos(n\psi) + b_{n,t}\sin(n\psi), \qquad (13)$$

$$\psi = 0, \ldots, 2\pi.$$

b) Estimate of Azimuth-Dependent $T_2$ Distribution

From the magnetization data $\tilde{M}(t)(\psi)$, the azimuth-dependent $T_2$ distribution can be estimated. For example, in one implementation, the reconstructed magnetization data in a quadrant can be averaged and the $T_2$ distribution can be estimated using an inverse-Laplace like transform.

Although only a few examples have been described in detail above, those skilled in the art will readily appreciate that many modifications are possible in the examples without materially departing from this subject disclosure. Accordingly, all such modifications are intended to be included within the scope of this disclosure as defined in the following claims.

What is claimed is:

1. A method of investigating an earth formation, comprising:
   moving a nuclear magnetic resonance (NMR) tool having a permanent magnet that generates a static, main magnetic field $B_0$ and two or more receiving coils located azimuthally around the NMR tool, wherein the two or more receiving coils rotate with a drilling string to which the NMR tool is attached and wherein the two or more receiving coils are locally sensitive to those spins in front of a respective coil at a respective time;
   applying one or more magnetic field pulses within the earth formation;
   using the two or more rotating receiving coils, acquiring signals generated in response to the $B_0$ field and the one or more magnetic field pulses, wherein measurements based on the acquired signals change with time due to the rotation of the NMR tool;
   processing the signals to obtain an indication of a parameter of the earth formation at multiple azimuthal orientations; and
   wherein said processing the signals is performed in accordance with a forward model based on: $M_t(\theta_j(t))=\int_0^{2\pi} M_t(\psi)k(\theta_j(t)-\psi)d\psi$, where $\psi$ is the formation angle and $M_t(\theta_j(t))$ denotes the measured data at time t when the jth receiving coil faces a time-dependent angle $\theta_j(t)$.

2. The method of claim 1, wherein the rotation of the two or more receiving coils causes ($\theta_j(t)$) to be a function of time which varies during each CPMG pulse train.

3. The method of claim 1, wherein said processing the signals further comprises using an inversion algorithm to generate estimates of an azimuth dependent $T_2$ distribution.

4. The method of claim 3, wherein the inversion algorithm first computes an estimate of an azimuth dependent magnetization and second computes, from the estimate, the azimuth dependent $T_2$ distribution.

5. The method of claim 3, wherein Fourier coefficients employed in processing the inversion algorithm are time dependent.

6. The method of claim 1, wherein a relative standard deviation of data reconstructed from the processed signals depends on a rate of rotation of the NMR tool.

7. A method of investigating an earth formation, comprising:

moving a nuclear magnetic resonance (NMR) tool having a permanent magnet that generates a static, main magnetic field $B_0$ and two or more receiving coils, wherein the two or more receiving coils are located at substantially the same axial position but azimuthally offset from one another such that the sensitivity of the two or more receiving coils varies as the NMR tool rotates;

applying one or more magnetic field pulses within the earth formation, wherein the applied magnetic field pulses are azimuthally uniform;

using the two or more rotating receiving coils, acquiring signals generated in response to the $B_0$ field and the one or more magnetic field pulses, wherein measurements based on the acquired signals include azimuthal orientation information based on the varying sensitivity of the two or receiving coils during rotation;

processing the signals to obtain an indication of a parameter of the earth formation at multiple azimuthal orientations; and wherein said processing the signals is performed in accordance with a forward model based on: $M_t(\theta_j(t)) = \int_0^{2\pi} M_t(\psi) k(\theta_j(t) - \psi) d\psi$, where $\psi$ is the formation angle and $M_t(\theta_j(t))$ denotes the measured data at time t when the jth receiving coil faces a time-dependent angle $\theta_j(t)$.

8. The method of claim 7, wherein each receiving coil is sensitive to different azimuthal portions of the earth formation at different times due to the rotation of the NMR tool.

9. The method of claim 7, wherein a kernel used to process the signals changes during operation to account for the rotation of the NMR tool.

10. The method of claim 7, wherein said processing the signals comprises using an inversion algorithm to generate estimates of an azimuth dependent $T_2$ distribution.

11. The method of claim 10, wherein the inversion algorithm first computes an estimate of an azimuth dependent magnetization and second computes, from the estimate, the azimuth dependent $T_2$ distribution.

12. The method of claim 10, wherein Fourier coefficients employed in processing the inversion algorithm are time dependent.

13. The method of claim 7, wherein a relative standard deviation of data reconstructed from the processed signals depends on a rate of rotation of the NMR tool.

14. A logging system for use within a subterranean formation, comprising:

a nuclear magnetic resonance (NMR) tool having a permanent magnet, a magnetic excitation source, and two or more radio frequency coils configured to acquire azimuthal magnetization information when rotated while in use, wherein the two or more receiving coils are locally sensitive to those spins in front of a respective coil at a respective time;

movement apparatus configured to move the NMR tool through the subterranean formation;

a processor configured to process measurement data acquired using the NMR tool, wherein the processor processes the measurements based on a generalized forward model that models azimuthal imaging magnetization decay and by executing an inversion algorithm that estimates azimuthally dependent $T_2$ distributions from the measurement data to obtain an indication of a parameter of the formation at multiple azimuthal orientations, wherein the forward model is based on: $M_t(\theta_1(t)) = \int_0^{2\pi} M_t(\psi) k(\theta_j(t) - \psi) d\psi$, where $\psi$ is the formation angle and $M_t(\theta_j(t))$ denotes the measured data at time t when the jth receiving coil faces a time-dependent angle $\theta_1(t)$.

15. The system of claim 14, wherein the inversion algorithm represents azimuthal magnetization at time t based on an orthonormal basis set.

16. The system of claim 15, wherein the orthonormal basis set comprises one of a Fourier expansion or a Haar expansion.

17. The system of claim 14, wherein the measurement data comprises a convolution of azimuth dependent magnetization with a known kernel that is dependent on the geometry of the NMR tool.

18. The system of claim 14, wherein the inversion algorithm is executed in two steps: a first step in which the azimuth-dependent magnetization is computed, and a second step in which an inverse Laplace-like algorithm is employed to estimate the azimuth dependent $T_2$ distribution.

19. The method of claim 1, wherein said processing further comprises azimuthally separating the spins into a plurality of bins based on the formation angle $\psi$.

20. The method of claim 19, wherein the spins in each bin decay at different rates corresponding to magnetizations at corresponding different times.

* * * * *